(12) United States Patent
Hecht et al.

(10) Patent No.: US 9,164,627 B2
(45) Date of Patent: Oct. 20, 2015

(54) ACOUSTIC TOUCH APPARATUS WITH VARIABLE THICKNESS SUBSTRATE

(75) Inventors: David S. Hecht, San Carlos, CA (US); Joel C. Kent, Fremont, CA (US)

(73) Assignee: Elo Touch Solutions, Inc., Milpitas, CA (US)

( * ) Notice: Subject to any disclaimer, the term of this patent is extended or adjusted under 35 U.S.C. 154(b) by 429 days.

(21) Appl. No.: 13/416,871

(22) Filed: Mar. 9, 2012

(65) Prior Publication Data

US 2013/0234994 A1    Sep. 12, 2013

(51) Int. Cl.
*G06F 3/041* (2006.01)
*G06F 3/043* (2006.01)

(52) U.S. Cl.
CPC ..................................... *G06F 3/043* (2013.01)

(58) Field of Classification Search
CPC combination set(s) only.
See application file for complete search history.

(56) References Cited

U.S. PATENT DOCUMENTS

| 5,854,450 | A | 12/1998 | Kent |
| 6,091,406 | A | 7/2000 | Kambara |
| 2011/0234545 | A1 | 9/2011 | Tanaka et al. |
| 2012/0007837 | A1 | 1/2012 | Kent et al. |

OTHER PUBLICATIONS

Son, K.T., et al.; U.S. Appl. No. 13/416,940, filed Mar. 9, 2012.
International Search Report and Written Opinion for Application No. PCT/US2013/029566; dated May 7, 2013.

*Primary Examiner* — Van Chow
(74) *Attorney, Agent, or Firm* — Alston & Bird LLP (57) ABSTRACT

An acoustic touch apparatus that has a variable thickness glass substrate that permits the transfer of surface acoustic waves between the back and front surfaces, thus enabling transducers to be placed on the substrate surface opposite the desired touch input surface.

22 Claims, 10 Drawing Sheets

ACOUSTIC TOUCH APPARATUS WITH VARIABLE THICKNESS SUBSTRATE

FIELD OF THE INVENTION

This invention generally relates to touch sensor systems and more particularly to surface acoustic wave (SAW) touchscreens.

BACKGROUND OF THE INVENTION

Touch sensor systems, such as touchscreens or touch monitors, can act as input devices for interactive computer systems used for various applications, for example, information kiosks, order entry systems, video displays, etc. Such systems may be integrated into a computing device, thus providing interactive touch capable computing devices, including computers, electronic book readers, mobile communications devices, and other touch sensitive devices including robots.

Generally, touch sensor systems enable the determination of a position on the surface of a substrate via a user's touch of the surface. For some applications such as track pads or touch sensitive robotic shells, the substrate may be made of an opaque material such as a metal. When the touch sensor is a transparent touchscreen, the touch substrate is typically made of some form of glass which overlies a computer or computing device display, like a liquid crystal display (LCD), a plasma display, etc. The touch sensor system is operatively connected to the device display so that it also enables the determination of a position on the device display and, moreover, of the appropriate control action of a user interface shown on the display.

Figure 1A:
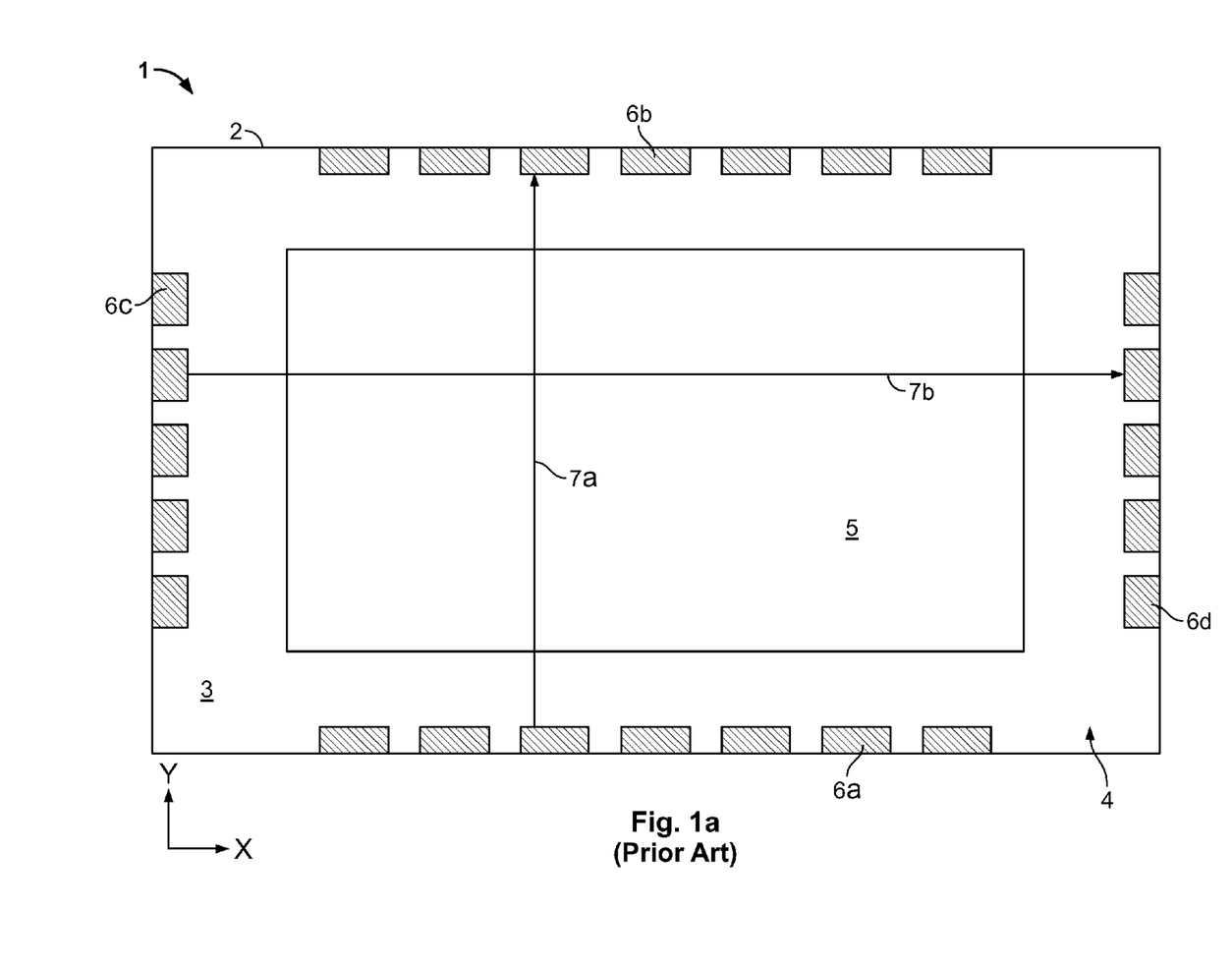
FIG. 1a is a front plan view of a substrate of an acoustic touch sensor.

Touch sensor systems may be implemented using different technologies. Acoustic touch sensors, such as ultrasonic touch sensors using surface acoustic waves, are currently one of the major touch sensor technologies and many types of acoustic touch sensors now exist. FIG. 1a shows a front plan view of a substrate 2 of a "non-Adler-type" acoustic touch sensor 1. A perimeter region 3 of the front surface 4 substrate 2 surrounds an interior touch region 5 of the substrate 2. A number of transducers 6a, 6b, 6c, 6d, such as wedge transducers, are bonded to the front surface 4 in the perimeter region 3. The touch sensor 1 uses a plurality of transducers per coordinate axis to spatially spread respective transmitted surface acoustic wave signals (e.g., shown in a solid line arrows 7a, 7b) and determine the touch region 5 coordinates. For example, for the X coordinate axis, X-axis transmitting transducers 6a at a respective perimeter region 3 generates surface acoustic wave pulses that propagate in the Y direction across the substrate 2 (across the touch region 5) along plural parallel paths to X-axis receiving transducers 6b disposed on the opposite perimeter region 3 where the waves are received for processing. The X coordinate of a touch in touch region 5 is determined by which of the transmit/receive transducer pairs corresponds to surface acoustic wave intercepted by the touch. Similarly, for the Y coordinate axis, Y-axis transmitting transducers 6c at a respective perimeter region 3 generates surface acoustic wave pulses that propagate in the X direction across the substrate 2 (across the touch region 5) along plural parallel paths to Y-axis receiving transducers 6d disposed on the opposite perimeter region 3 where the waves are received for processing. The Y coordinate of a touch in touch region 5 is determined by which of the transmit/receive transducer pairs corresponds to surface acoustic wave intercepted by the touch. The transducer arrangement provides a grid pattern to enable two-dimensional coordinates of a touch on the touch region 5 to be determined. Touching the touch region 5 at a point causes a loss of energy by the surface acoustic waves passing through the point of touch. This is manifested as an attenuation of the surface acoustic waves. Detection circuitry associated with each receiving transducer 6b, 6d detects the amplitudes of the surface acoustic wave signals and observes which transmit/receive transducer pairs have perturbed or attenuated signals as a means to determine the surface coordinates on the touch region 5. A controller (not shown) drives the operation of the transducers 6 and provides the touch coordinates to an operating system and software applications to provide the required user interface with a display operably connected to the transducers 6. Note that the touch sensor 1 is illustrated as flat and rectangular, but may take on different shapes and configurations depending upon the application.

An "Adler-type" acoustic touch sensor uses only two transducers per coordinate axis to spatially spread a transmitted surface acoustic wave signal and determines the touch surface coordinates by analyzing temporal aspects of a wave perturbation from a touch. For each axis, one transducer at a respective peripheral surface generates surface acoustic wave pulses that propagate through the substrate across a perpendicular peripheral surface along which a first reflective grating or array is disposed. The first reflective array is adapted to reflect portions of a surface acoustic wave perpendicularly across the substrate along plural parallel paths to a second reflective array disposed on the opposite peripheral surface. The second reflective array is adapted to reflect the surface acoustic wave along the peripheral surface to a second transducer at a respective perpendicular peripheral surface where the wave is received for processing. The reflective arrays associated with the X axis are perpendicular to the reflective arrays associated with the Y axis so as to provide a grid pattern to enable two-dimensional coordinates of a touch on the substrate to be determined. Touching the substrate surface at a point causes a loss of energy by the surface acoustic waves passing through the point of touch. This is manifested as an attenuation of the surface acoustic waves. Detection circuitry associated with each receiving transducer detects the attenuation as a perturbation in the surface acoustic wave signal and performs a time delay analysis of the data to determine the surface coordinates of a touch on the substrate.

Historically, devices utilizing an acoustic touch sensor, like a touchscreen and touch pad products, were associated with a protective bezel. An acoustic touch sensor may have a large number of operative elements (either multiple transducers, or transducer and reflective array combinations) disposed on, and along, the front peripheral surfaces of the substrate. In order to prevent damage due to exposure from the environment or external objects, the housing for these sensors or for the devices integrating a sensor may include a bezel that hides and protects these peripheral operative elements, so that only an active touch region on the front surface of the substrate is exposed for possible touch input.

Current trends eliminate the bezel in favor of flush surroundings of touch area. This market trend is also affecting touch input devices of larger desktop sizes as indicated by the market interest for zero-bezel SAW touchscreens in the 20-inch and larger size range. Looking further into the future, as imagined by some visionaries of "ubiquitous computing", currently passive objects like glass table tops could become touch input devices. Furthermore, even now there are hints of cross-fertilization between touch technology and robotics and perhaps future SAW touch technology may find a use endowing robots with a sense of touch in their exterior shells. All these trends and possible extrapolations of touch technology into the future motivate moving transducers and arrays of SAW touch sensors from the exterior touch sensing surface of the substrate to the protected and hidden interior surfaces of the touch substrate.

Acoustic touch sensors may utilize a rounded-substrate-edge approach to obtain such a zero-bezel or bezel-less design. Such sensors operate by using transmitting elements on the back surface that propagate surface acoustic waves around respective curved substrate edges, across the front surface, and around opposite curved substrate edges to reach the receiving elements on the back surface. Bezel-less acoustic touch sensors may enlarge the active touch region to essentially the whole front surface of the substrate, which may be beneficial for a variety of touch input applications from small-sized integrated devices like a smartphone or a tablet computer to a desktop computer and larger touch applications. Further, the combination of protected internal transducers and arrays plus sensitivity for essentially the whole exposed surface is of interest for touch sensitive robotic shells.

Figure 1B:
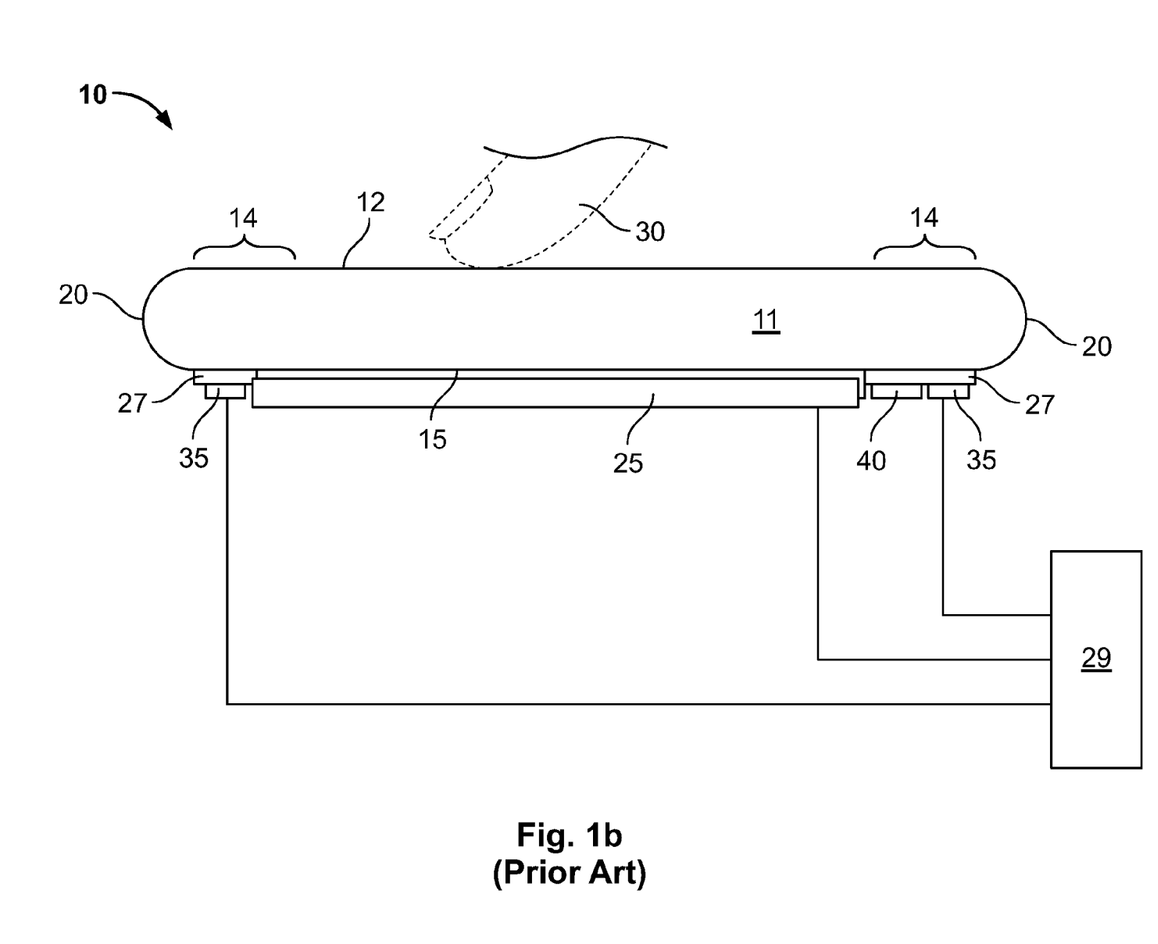
FIG. 1b is a simplified cross-sectional view of an acoustic touch sensor having curved substrate edges.

FIG. 1b shows a simplified cross-sectional view of an acoustic touch sensor 10 having curved substrate edges. The touch sensor 10 comprises a substrate 11 with a front surface 12, a back surface 15, and connecting end surfaces 20 joining the peripheral regions 14 of the front surface 12 and of the back surface 15. A connecting end surface 20 need not be curved as shown but generally can have any shape that supports transfer of surface acoustic waves between the front and back surfaces 12, 15. The substrate 11 is typically made of some form of glass which overlies a computer display or computing device display 25, like a liquid crystal display (LCD), a cathode ray tube (CRT), a plasma display, etc. In a bezeled surface acoustic wave touch sensor, the peripheral region 14 of the front surface 12 is covered by a bezel provided by the housing of the touch sensor 10 or the device integrating the sensor 10, since the transducers and reflective arrays are on the front surface 12 of the substrate 11. In a bezel-less surface acoustic wave touch sensor, which is shown in the figure, the peripheral region 14 of the front surface 12 is merely the outer/peripheral portion of the front surface 12 and no bezel is required of the associated housing as there are no exposed transducers and reflective arrays. Note that the terms "bezeled" and "bezel-less" are used to connote touch sensors that when installed respectively either require, or do not require, a bezel covering the perimeter of the substrate in order to protect arrays and transducers. Bezel-less surface acoustic wave touch sensors are described in more detail in commonly-owned U.S. Published Application 2011/0234545, entitled "Bezel-less Acoustic Touch Apparatus", which is herein incorporated by reference. Object 30 is seen in FIG. 1b as a finger, but it is recognized that touches sensed by the surface acoustic waves may include a stylus pressing against the front surface 12 directly or indirectly, through a cover sheet or like element, depending upon the application of the touch sensor 10. Acoustic transducers 35 and reflective element arrays 40 are provided on, and hidden by, a border layer 27 of opaque paint or ink in the peripheral region 14 of the back surface 15. The transducers 35 are operably coupled to a controller or control system 29 (which may be part of a system processor in some embodiments) that is also operably coupled to the display 25. The controller or control system 29 drives the operation of the transducers 35 and measures the signals from such transducers to determine the touch coordinates, which are then provided to an operating system and software applications to provide the required user interface with the display 25.

The curved substrate edges however require particular precision to manufacture. Parasitic signals may otherwise form if the edges are not machined with perfect radii. This, in turn, makes the manufacture of the substrate more costly than conventional, straight-edged substrates. Also, as described in FIG. 1b, in many bezel-less sensors that have certain aesthetic considerations, the periphery of the back surface of the substrate may have an opaque ink or paint applied thereon with the peripheral operative elements being printed on top of the "border ink" in order to hide the elements from view through the typically transparent substrate. For these sensors, the curved edges of the substrate do not allow for the border ink to be applied entirely to the ends of the back surface, which then have to be made opaque in some other manner. For small-sized integrated devices (i.e., mobile or handheld SAW products), the substrate would not have its edging exposed and instead would typically be mounted flush with the device's protective cover on the outside edge. However, this mounting would be easier and, likely, more effective if the sensor has non-curved substrate edges. Acoustically active rounded outside edges may also be problematic in other SAW touch sensor applications, for example, a touch sensitive robot shell made of a tiling of metal SAW touch sensors where a water tight seal is desired where outside edges of component sensors meet.

SUMMARY OF THE INVENTION

The above problems are obviated by the present invention which provides an acoustic touch apparatus, comprising a substrate, having front and back surfaces, that is adapted in a first region to propagating surface acoustic waves along substrate surfaces and in a second region to transferring propagating surface acoustic waves from the one of the surfaces to the other surface through the substrate; at least one acoustic wave transducer on the back surface that is adapted to transmit surface acoustic waves; and at least one acoustic wave transducer on the back surface that is adapted to receive surface acoustic waves from the transmitting transducer, said substrate having, between the transmitting transducer and the receiving transducer, at least one first region disposed between two second regions. The first region may have a thickness that is at least 3.5 Rayleigh wavelengths or, alternatively, a thickness that is at least 5.5 Rayleigh wavelengths. Also, the second region may have a thickness sufficiently thin to convert a surface acoustic wave on a first surface to a surface acoustic wave on a second surface. In such case, the second region may be dimensioned to inhibit the surface acoustic wave on the second surface from converting back to a surface acoustic wave on the first surface. Also, the second region may have a thickness sufficiently thin to transfer acoustic surface wave energy between the front and back surfaces of the substrate. Alternatively, a portion of the back surface in the first region may be less than 3.5 Rayleigh wavelengths thick and have a coating material applied thereon sufficient to suppress the transfer of acoustic surface wave energy between the front and back surfaces of the substrate within that portion.

Also, the first region and the second regions may be dimensioned so that the surface acoustic waves transmitted by the transmitting transducer travel from the back surface to the front surface through the substrate; along the front surface; and from the front surface to the back surface through the substrate to be received by the receiving transducer, said front surface forming a touch sensing region for the apparatus. In such case, the length of the second region may be approximately one-half of the beat wavelength of the surface acoustic waves and, further, the thickness of the second region may be adjustable to tune the beat wavelength and the length of the second region to selected respective measurements. Also, the length of the first region may be shorter than the beat wavelength of the surface acoustic waves.

The present invention also provides an acoustic touch apparatus, comprising a substrate that has front and back surfaces and that is adapted in a first region to propagating surface acoustic waves along substrate surfaces and in a second region to transferring propagating surface acoustic waves from the one of the surfaces to the other surface through the substrate; at least one acoustic wave transducer on the back surface that is adapted to transmit surface acoustic waves; at least one acoustic wave transducer on the back surface that is adapted to receive surface acoustic waves; at least one reflective array on the back surface that is adapted to reflect the surface acoustic waves from the transmitting transducer towards the receiving transducer; and at least one reflective array on the back surface that is adapted to receive and reflect the reflected transmitted surface acoustic waves to the receiving transducer, said substrate having, between the transmitting transducer and the receiving transducer, at least one first region disposed between two second regions. The first region may have a thickness that is at least 3.5 Rayleigh wavelengths or, alternatively, a thickness that is at least 5.5 Rayleigh wavelengths. Also, the second region may have a thickness sufficiently thin to convert a surface acoustic wave on a first surface to a surface acoustic wave on a second surface. In such case, the second region may be dimensioned to inhibit the surface acoustic wave on the second surface from converting back to a surface acoustic wave on the first surface. Also, the second region may have a thickness sufficiently thin to transfer acoustic surface wave energy between the front and back surfaces of the substrate. Alternatively, a portion of the back surface in the first region may be less than 3.5 Rayleigh wavelengths thick and have a coating material applied thereon sufficient to suppress the transfer of acoustic surface wave energy between the front and back surfaces of the substrate within that portion.

Also, the first region and the second regions may be dimensioned so that the surface acoustic waves transmitted by the transmitting transducer and reflected by the first reflective array travel from the back surface to the front surface through the substrate; along the front surface; and from the front surface to the back surface through the substrate to be reflected by the second reflective array to the receiving transducer, said front surface forming a touch sensing region for the apparatus. In such case, the length of the second region may be approximately one-half of the beat wavelength of the surface acoustic waves and, further, the thickness of the second region may be adjustable to tune the beat wavelength and the length of the second region to selected respective measurements. Also, the length of the first region may be shorter than the beat wavelength of the surface acoustic waves.

The present invention also provides an acoustic touch sensor having a variable thickness substrate that is adapted to form a wave path for surface acoustic waves from a transmitting transducer to a receiving transducer that includes regions of the substrate, before and after an active touch surface, in which surface acoustic waves transfer from one propagating surface to another propagating surface through the substrate.

The present invention also provides an acoustic touch sensor, comprising: a substrate that is adapted to transfer surface acoustic wave energy between front and back surfaces of the substrate, said front surface forming the touch region of the sensor and said back surface having the operative elements of the sensor, and that has bonding material applied to a region of the back surface that is adapted to dampen surface acoustic wave energy transfer along a counterpart region of the front surface sufficiently to maintain the propagation of surface acoustic waves on the counterpart region, said surface acoustic waves transmitted from the operative elements on the back surface transferring to the front surface through the substrate; travelling along the counterpart region of the front surface; and transferring thereafter to the back surface through the substrate to be received by the operative elements.

The present invention also provides a method of providing an acoustic touch sensor, comprising: providing a substrate that has a thickness sufficiently thin to transfer surface acoustic wave energy between the front and back surfaces of the substrate, said front surface forming the touch region of the sensor and the back surface having the operative elements of the sensor; and applying bonding material on a region of the back surface that is adapted to dampen surface acoustic wave energy transfer along a counterpart region of the front surface sufficiently to maintain the propagation of surface acoustic waves on the counterpart region.

BRIEF DESCRIPTION OF THE DRAWINGS

For a better understanding of the present invention, reference is made to the following description of exemplary embodiments thereof, and to the accompanying drawings, wherein:

FIG. 4b is a simplified cross-sectional view of a variation of the sensor of FIG. 2a;

FIG. 5 is a simplified cross-sectional view of another variation of the sensor of FIG. 2a.

DETAILED DESCRIPTION OF SPECIFIC EMBODIMENTS OF THE INVENTION

One method of transferring propagating surface acoustic waves from the front surface to the back surface of the substrate without the use of curved edges would be to transfer the waves through the substrate. This can be accomplished utilizing a unique property of surface acoustic waves generated for an acoustic touch sensor. Specifically, surface acoustic waves propagating on one surface of a substrate may transfer, under certain circumstances, through the substrate to the other surface. Generally, this transfer can occur when the depth of the substrate is sufficiently small. To avoid undesired transfer, it has been previously reported that the typical substrate (i.e., soda-lime glass) of an acoustic touch sensor, using the standard transmitting frequency of 5.53 MHz, should be at least 2 mm thick for generating propagating surface acoustic waves, that is, at least 3.5 Rayleigh wavelengths. The current standard used in acoustic touch sensors is an approximately 3 mm thick substrate. These propagating surface acoustic waves are maintained on the substrate surface of the transmitting transducer, such as surface waves on the ocean are maintained on the ocean surface, although in both cases wave motion and power penetrates some depth into the wave medium of glass or water. However, at certain smaller thicknesses, the surface acoustic wave energy becomes transferred (actually oscillates) to the opposing surface of the substrate.

More specifically, the transmitting transducers of an acoustic touch sensor normally produce a surface acoustic wave which is typically termed a Rayleigh-type wave. A Rayleigh wave has vertical and transverse wave components with substrate particles moving along an elliptical path in a vertical plane including the axis of wave propagation, and wave energy decreasing with increasing depth in the substrate. Mathematically, Rayleigh waves exist only in semi-infinite media. In plates or substrates of finite thickness, such as those used in acoustic touch sensors, the waves are more precisely termed quasi-Rayleigh waves, each of which comprises a superposition of equal portions of the lowest order symmetric and anti-symmetric Lamb wave modes $S_0$ and $A_0$. For substrates of thickness of interest for acoustic touch sensors, the $S_0$ Lamb wave mode is essentially a surface acoustic wave on the transmitting (or top) surface simultaneous with an in-phase surface acoustic wave on the non-transmitting (or bottom) surface, while the $A_0$ Lamb wave mode is similar except the surface acoustic wave on the bottom surface is out of phase with the surface acoustic wave on the top surface. A quasi-Rayleigh wave on the top surface is a positive superposition of the two wave modes (i.e., $S_0+A_0$) which cancels the surface acoustic wave on the bottom surface and a quasi-Rayleigh wave on the bottom surface is a negative superposition of the two wave modes (i.e., $S_0-A_0$) which cancels the surface acoustic wave on the top surface. A transmitted (or launched) pure $S_0$ or $A_0$ wave will forever remain a $S_0$ or $A_0$ wave, respectively, since each is a true mode of vibration. In contrast, neglecting glass attenuation, a launched top quasi-Rayleigh wave, which is not a true mode of vibration, will eventually convert into a bottom quasi-Rayleigh wave and the two waves will continue to oscillate back and forth in a beat pattern. This is because the wave modes $S_0$ and $A_0$ have slightly different phase velocities so that the $A_0$ phase relative to the $S_0$ phase continually changes and with enough distance $S_0+A_0$ becomes $S_0-A_0$ and then back again, repeatedly. This is an example of the classical coupled oscillator system that occurs in many contexts. The result is surface wave energy is transferred back and forth between the top and bottom surfaces of the substrate, as indicated above.

Figure 1C:
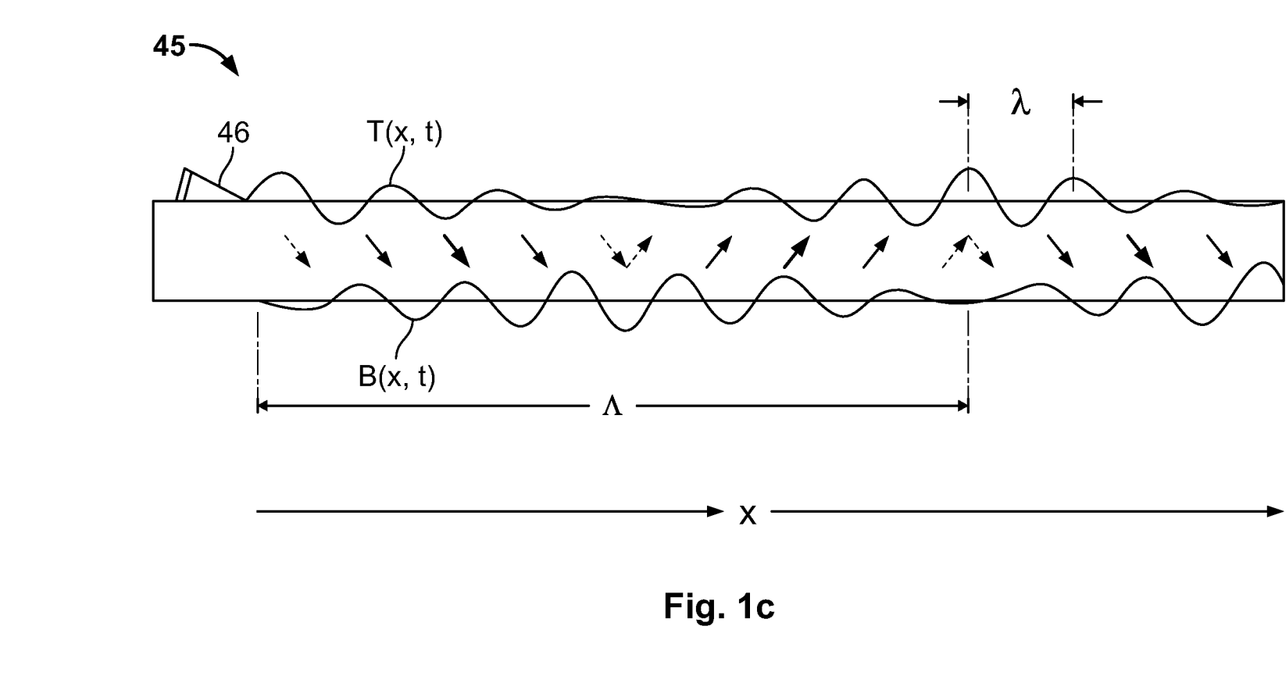
FIG. 1c is an illustration of top-bottom oscillation phenomenon in a thin substrate.

FIG. 1c is an illustration of this top-bottom oscillation for a thin substrate 45 that may be used in an acoustic touch sensor. Neglecting attenuation effects, if "x" is the distance of propagation away from a wedge transducer 46 continuously excited at frequency f, the wave amplitude (e.g. vertical particle displacement) on the top surface T(x,t) and the wave amplitude on the bottom surface B(x,t) will vary with position and time as follows, where λ is the Rayleigh wavelength at frequency f and Λ is a beat wavelength that characterizes the oscillation of the Rayleigh wave between surfaces:

$$T(x,t)=\text{Constant}\cdot\cos(\pi x/\Lambda)\cdot\cos(2\pi x/\lambda-2\pi f\cdot t) \text{ and}$$

$$B(x,t)=\text{Constant}\cdot\sin(\pi x/\Lambda)\cdot\sin(2\pi x/\lambda-2\pi f\cdot t).$$

It is important to note that, in half a beat wavelength, Λ/2, a Rayleigh wave on one surface is completely transferred to the other surface. The time averaged power transfer between Rayleigh waves on the two surfaces is schematically represented by the solid line arrows and is proportional to $\sin(2\pi x/\Lambda)$, where a positive algebraic sign signifies power transfer from top to bottom and a negative sign signifies power transfer in the other direction. Where either the top or bottom amplitude is small, the power transfer is also small (this is discussed in further detail below with respect to optical bonding).

The phenomenon of top-bottom oscillation is conventionally regarded as a problem to avoid in acoustic touch sensor design so as to maintain propagating surface acoustic waves on a respective surface. And for this purpose, the touch substrate is designed as a rule to be at least 3 to 4 Rayleigh wavelengths thick to suppress top-bottom oscillations. A substrate of 3.5 Rayleigh wavelengths is generally sufficient to suppress top-bottom oscillations and a substrate thickness of 5.5 Rayleigh wavelengths is, for all practical engineering purposes, sufficient to eliminate top-bottom oscillations.

The key engineering parameters to consider are the transmitting frequency, the distance across the substrate (i.e., the top-bottom oscillation distance) required for a top surface acoustic wave to convert into a bottom surface acoustic wave (and vice versa), the thickness of the substrate, and the acoustic path lengths of the touch sensor. Generally, the thinner the substrate, the shorter the distance for this top-to-bottom energy transfer. If the top-bottom oscillation distance is then comparable or short compared to the acoustic path lengths, then the surface wave energy will not be maintained on the top surface. Consequently, the surface acoustic wave launched on one surface of the substrate will appear on the other surface. It would be advantageous to utilize this process to transfer propagating surface acoustic waves from the front surface to the back surface of the substrate of an acoustic touch sensor without the use of curved edges. This is further described in commonly-owned application Ser. No. 13/416,940 entitled, "Acoustic Touch Apparatus With Multi-Touch Capability", concurrently filed in the name of Kyu-Tak Son and Joel Kent, which is hereby incorporated by reference.

It is noted that there may be other ways, like the use of substrate coatings, to suppress the oscillations that may be useful in further applications. Oscillation of Rayleigh wave power between top and bottom substrate surfaces is just one example of a beat phenomenon encountered when a pair of identical oscillators or waves are weakly coupled. It is essential to the beat phenomenon that the oscillators be identical, at least to a good engineering approximation. A coating applied to one substrate surface and not the other results in a Rayleigh wave phase velocity and wavelength on the uncoated surface of $V_R$ and $\lambda_R$, respectively, and on the coated surface of $V_R'$ and $\lambda_R'$, respectively. The differences in these quantities may be expressed as $\Delta V_R=(V_R-V_R')$ and $\Delta\lambda_R=(\lambda_R-\lambda_R')$. To support full oscillation of the Rayleigh wave power between the surfaces, phase coherence must be maintained at least over a distance comparable to the beat wavelength Λ. This leads to the following condition, for a good engineering approximation, to obtain "identical" top and bottom Rayleigh waves and maintain the beat phenomenon: $\Delta V_R/V_R=\Delta\lambda_R/\lambda_R\ll\lambda_R/\Lambda$. This is important for transparent touchscreen applications in which an opaque coating (e.g. black) is needed for cosmetic reasons, but the transfer is sought of wave power between the surfaces where the coating is applied. On the other hand, if the Rayleigh waves on the top and bottom surfaces are far from identical, the beat phenomenon will be suppressed and little wave power will be transferred between the substrate surfaces. This is expressed quantitatively as follows: $\Delta V_R/V_R=\Delta\lambda_R/\lambda_R\gg\lambda_R/\Lambda$ (beat phenomenon suppressed). This is important for applications when there is a desire to suppress transfer of wave power between the surfaces without resorting to increased substrate thickness. Investigations show that even a thin substrate coating may be sufficient.

Figure 2A:
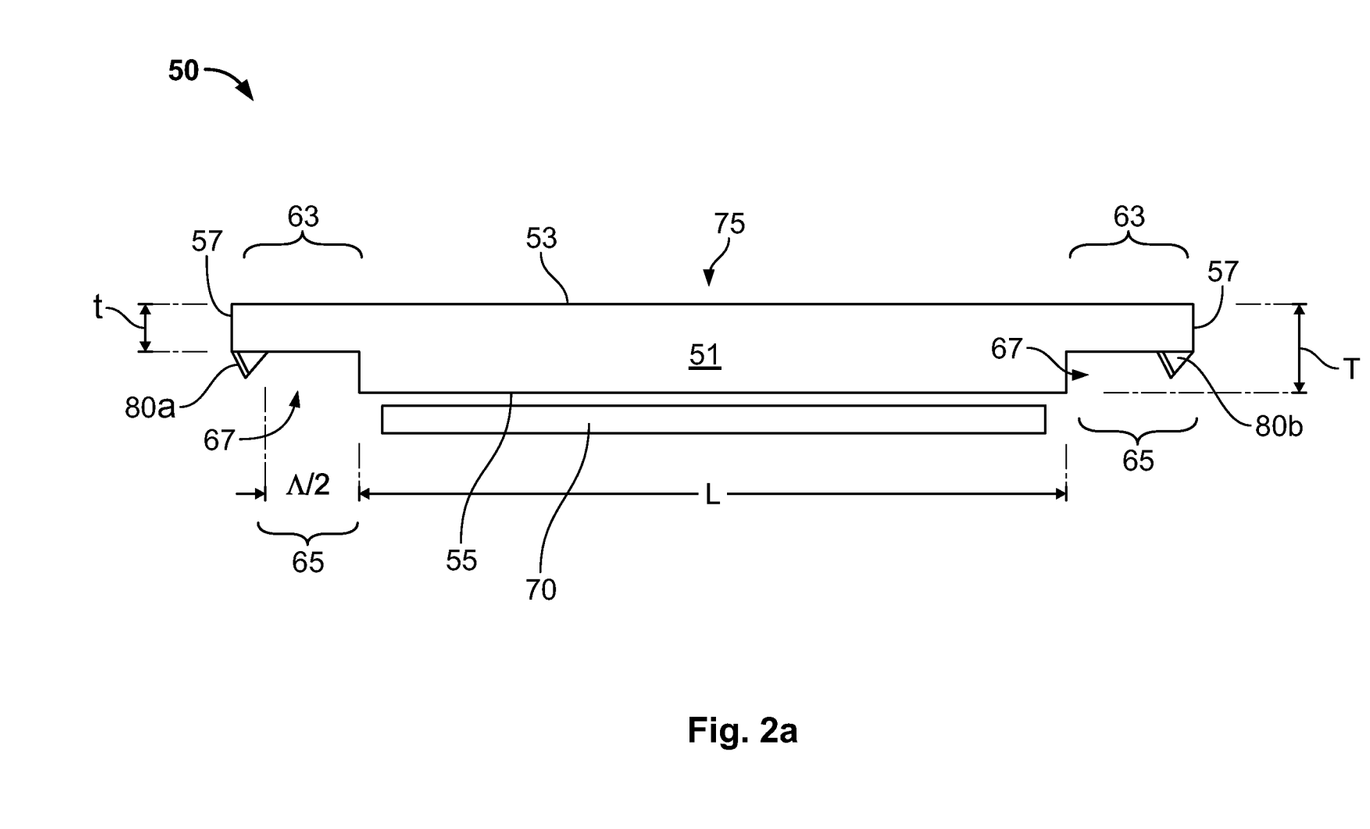
FIG. 2a is a simplified cross-sectional view of a first acoustic touch sensor constructed in accordance with the present invention.

FIG. 2a shows a simplified cross-sectional view of a first acoustic touch sensor 50 constructed in accordance with the present invention. The touch sensor 50 comprises a substrate 51 with a front surface 53, a back surface 55, and connecting end surfaces 57 joining the peripheral region 63 of the front surface 53 with the peripheral region 65 of the back surface 55. The back surface 55 is configured with a surface indent 67 that is formed adjacent the peripheral region 65 around the entire back surface 55. A surface indent 67 is formed so there is a distinct difference, as described below, between the thickness of the substrate 51 at the indent 67, and in the peripheral regions 63, 65, (labeled as t) with the thickness of the substrate 51 in the non-indented, non-peripheral region (labeled as T).

The substrate 51 may be made of a transparent material such as glass (e.g., soda-lime glass) and overlie a computer display or computing device display 70, like a liquid crystal display (LCD), a cathode ray tube (CRT), a plasma display, etc. (with an air gap normally therebetween). Importantly, the substrate 51 may be of any material that can propagate Rayleigh waves including glass, metals and polymers with sufficiently low acoustic attenuation rates. For example, one embodiment of the touch sensor 50 may be an opaque track pad with an aluminum substrate. Object 75, shown as a solid line arrow, represents an object that touches the front surface 53 and it is recognized that touches sensed by the surface acoustic waves may include a finger or a stylus pressing against the front surface 53 directly or indirectly, through a cover sheet or like element, depending upon the application of the touch sensor 50. Whether transparent or opaque, the touch sensor 50 may be operably connected to the computing device display 70.

In the architecture of this embodiment of the present invention, the touch sensor 50 comprises acoustic transducers 80a, 80b, such as wedge transducers, that are bonded to the back surface 55 at the outside of the peripheral region 65. From a plan view perspective, the acoustic transducers 80a, 80b serve a similar function as the acoustic transducers 6a, 6b of the touch sensor 1 of FIG. 1a. For applications where the substrate 51 is transparent, the transducers 80a, 80b are provided on a border layer (not shown) of opaque paint or ink in the peripheral region 65 of the back surface 55. This is coating discussed in more detail below with respect to FIGS. 4a-4c. Transmitting transducers 80a that generate surface acoustic waves are situated on one side of the substrate 51 and corresponding receiving transducers 80b that receive the respective generated surface acoustic waves are situated on the opposing side. Another set of transmitting and receiving transducers 80a, 80b are arranged in the same fashion on the other two opposing sides of the substrate 51 (which is shown in the figure to be generally rectangular). In this way, propagating surface acoustic waves are respectively generated and received in each of the two planar coordinate axes (X and Y) of the front surface 53 of the substrate 51. The transducers 80a, 80b are operably coupled to a controller or control system (not shown), which may be part of a system processor in some embodiments, that is also operably coupled to the display 70. The controller or control system drives the operation of the transducers 80a, 80b and measures the signals from such transducers to determine the touch coordinates, which are then provided to an operating system and software applications to provide the required user interface with the display 70.

The thickness t of the substrate 51 at the indent 67 (and in the peripheral regions 63, 65) is such to permit surface wave energy to be transferred between the front and back surfaces 53, 55 and make surface acoustic waves propagating on one surface to appear on the other surface. The thickness T of the substrate 51 in the non-indented, non-peripheral region is such to maintain surface acoustic waves propagating on a respective surface. For example, the thickness T of the non-peripheral region may be at least 2 mm for a system operating at 5.53 MHz and using a glass or aluminum substrate material to suppress energy transfer, and more preferably 3 mm. Stated more generally to apply to any material and any operating frequency, the thickness T is preferably at least 3.5 Rayleigh wavelengths and more preferably 5.5 Rayleigh wavelengths. Further, the length of the indent 67 and the indented peripheral regions 63, 65 is such to accommodate a top-bottom (and bottom-top) energy transfer before the surface acoustic waves become maintained on a respective surface (or are received by a receiving transducer 80b) and the length L of the substrate 51 in the non-indented, non-peripheral region is such to maintain surface acoustic waves propagating on the respective surface. More precisely, the length of the thinned perimeter region 63, 65, 67 is approximately one-half of the beat wavelength (labeled as Λ/2) so that Rayleigh waves transmitted from a transducer 80a are transferred from the back surface 55 to the front surface 53 by the time they reach the non-indented, non-peripheral region of the substrate 51 of thickness T. The thickness t of the thinned perimeter region 63, 65, 67 can be adjusted to tune the beat wavelength Λ, and hence the length of the thinned perimeter region, as desired. The thickness T of the non-indented, non-peripheral region is chosen to be sufficiently large so that the beat wavelength in this thicker central region is long compared to the acoustic path length L through the thicker central region. This suppresses the oscillation phenomenon and the Rayleigh wave propagating on the front surface 53 of the thicker central region remains on the front surface 53 until it reaches the thinned perimeter region 63, 65, 67 on the other side of the substrate 51 where it transfers to the back surface 55 and is received by a transducer 80b.

Figure 2B:
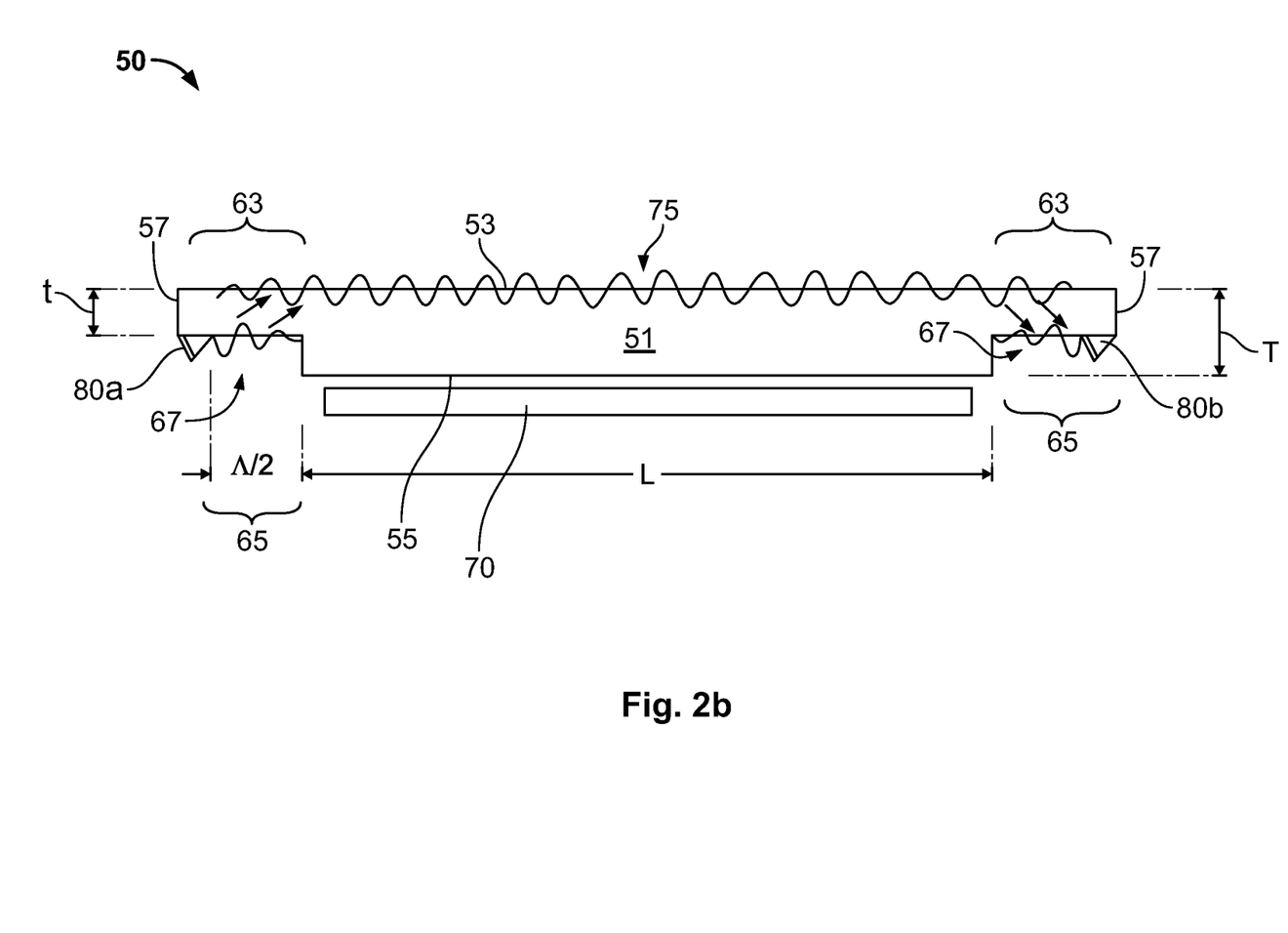
FIG. 2b is the cross-sectional view of the first acoustic touch sensor of FIG. 2a with propagating surface acoustic waves.

This is illustrated in FIG. 2b. In operation, the transmitting transducers 80a generate surface acoustic waves that travel along the surface of the peripheral region 65 of the back surface 55 on which the transmitting transducers 80a are situated. This is shown as the solid sinusoidal line indicating the wave propagation path. As seen by the slanted solid line arrows, the thickness (or thinness) t of the substrate 51 that is used in this region 65 and the length Λ/2 of the region permits the surface acoustic waves to "travel" to the front surface 53 via the energy transfer caused by the action of the Lamb wave modes $S_0$ and $A_0$. The thickness T of the substrate 51 that is used in the non-indented, non-peripheral region and the length L of this thicker region then maintains a wave propagation path on the front surface 53. As seen by the next slanted solid line arrows, the thickness t of the substrate 51 in the peripheral region 63 of the front surface 53 and the length Λ/2 of the region permits the surface acoustic waves to "travel" to the back surface 55 via the energy transfer caused by the action of the Lamb wave modes $S_0$ and $A_0$. The surface acoustic waves are maintained propagating on the back surface 55 in the peripheral region 65 long enough to travel to the receiving transducers 80b.

Like other acoustic touch sensors, the touch of the front surface 53 by an object 75, such as finger or stylus, absorbs a portion of the energy of the surface acoustic waves propagating across the front surface 53 and causes an attenuation of the waves passing through the point of touch. The resulting attenuation is detected by the receiving transducers 80b as a perturbation in the acoustic signal. The control system processes and analyzes the electrical signals transduced by the receiving transducers 80*b*, including those related to waveform perturbations, to detect the touch coordinates and position information. Further, the control system maps the touch coordinates and position information to the appropriate control actions of the user interface shown in the display 70. The acoustic touch sensor 50 thus provides an XY coordinate input device system. Note that the touch sensor 50 is illustrated as flat and rectangular, but may take on different shapes and configurations depending upon the application.

Figure 3:
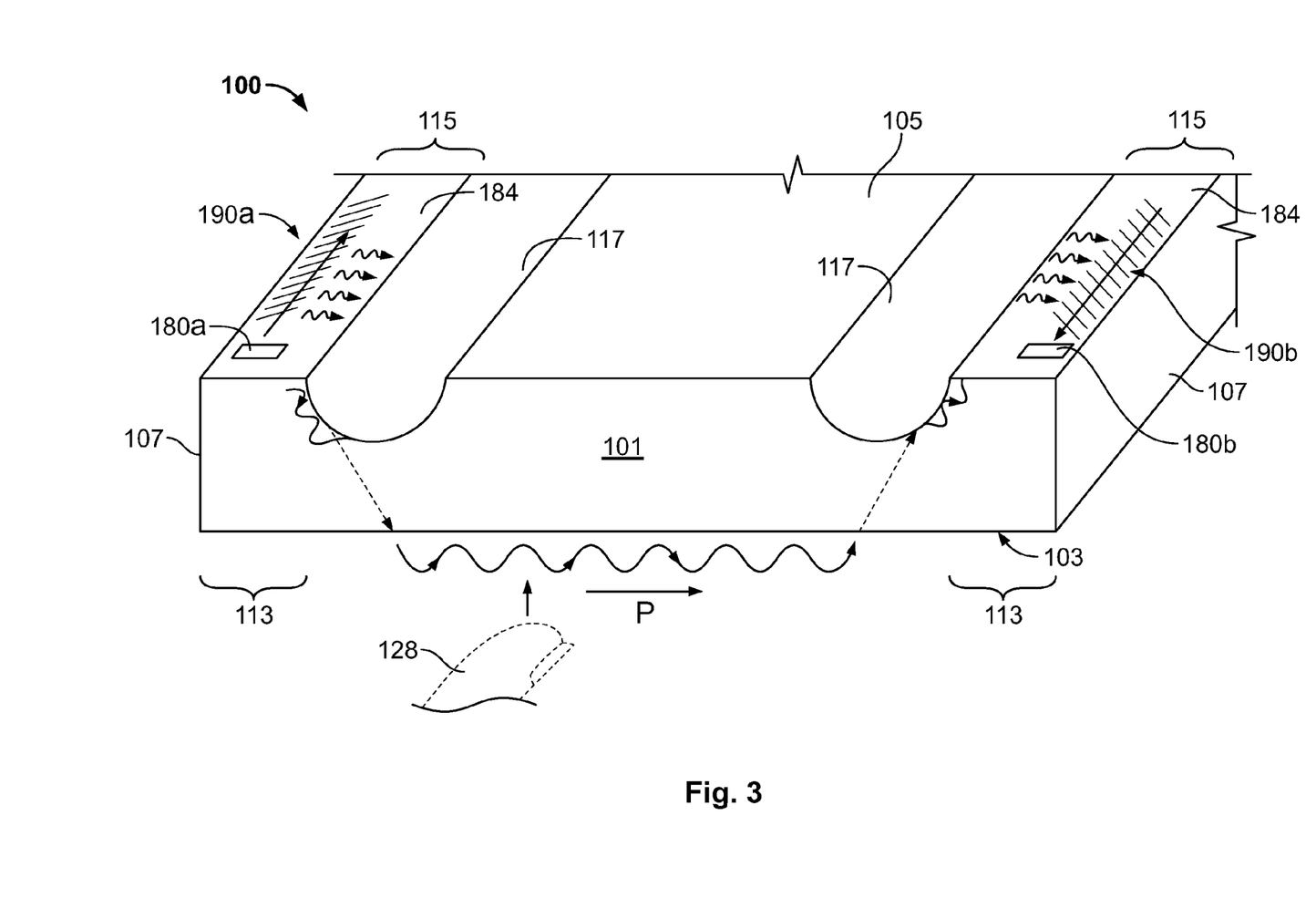
FIG. 3 is a simplified cross-sectional view of a second acoustic touch sensor 100 constructed in accordance with the present invention.

FIG. 3 shows a simplified cross-sectional view of a second acoustic touch sensor 100 constructed in accordance with the present invention. The touch sensor 100 comprises a substrate 101 with a front surface 103, a back surface 105, and connecting end surfaces 107 joining the peripheral region 113 of the front surface 103 with the peripheral region 115 of the back surface 105. The back surface 105 is configured with a surface recess 117 that is formed adjacent the peripheral region 115 around the entire back surface 105.

The surface recess 117 is formed so the thickness of the substrate 101 at the recess 117 is such to permit surface wave energy to be transferred between the front and back surfaces 103, 105 and make surface acoustic waves propagating on one surface to appear on the other surface. The thicknesses of the substrate 101 in the non-recessed regions are such to maintain surface acoustic waves propagating on a respective surface (for example, at least 2 mm at 5.53 MHz for a glass or aluminum substrate). Further, the length of the surface recess 117 is such to accommodate a top-bottom (and bottom-top) energy transfer before the surface acoustic waves become maintained on a respective surface and the lengths of the substrate 101 in the non-recessed regions are such to maintain surface acoustic waves propagating on a respective surface.

The substrate 101 may be made of a transparent material such as glass (e.g., soda-lime glass) and have the back surface 105 overlie a computer display or computing device display (not shown), like a liquid crystal display (LCD), a cathode ray tube (CRT), a plasma display, etc. (with an air gap normally therebetween). Similar to the figures above, object 128 is seen in FIG. 3 as a finger, but it is recognized that touches of the front surface 103 sensed by the surface acoustic waves may include a stylus pressing against the front surface 103 directly or indirectly, through a cover sheet or like element, depending upon the application of the touch sensor 100.

In this embodiment of the present invention, the touch sensor 100 takes on the architecture of an "Adler-type" acoustic touch sensor, as described above, that uses only two transducers per coordinate axis to spatially and temporally spread a transmitted surface acoustic wave signal. For each axis, one transducer at a respective peripheral surface generates surface acoustic wave pulses that propagate through the substrate across a perpendicular peripheral surface along which a first reflective grating or array is disposed. The first reflective array is adapted to reflect portions of a surface acoustic wave perpendicularly across the substrate along plural parallel paths to a second reflective array disposed on the opposite peripheral surface. The second reflective array is adapted to reflect the surface acoustic wave along the peripheral surface to a second transducer at a respective perpendicular peripheral surface where the wave is received for processing. The reflective arrays associated with the X axis are perpendicular to the reflective arrays associated with the Y axis so as to provide a grid pattern to enable two-dimensional coordinates of a touch on the substrate to be determined.

FIG. 3 shows the operative elements for the "Adler-type" architecture for one of the axes. Specifically, the touch sensor 100 comprises acoustic transducers 180*a*, 180*b* that are provided on an optional border layer 184 of paint or ink in the peripheral region 115 of the back surface 105. The optional border layer 184 of paint or ink may be desirable for cosmetic reasons to hide the transducers 180*a*, 180*b* and the arrays 190*a*, 190*b* if the substrate 101 is transparent. This coating is discussed in more detail below with respect to FIGS. 4*a*-4*c*. If the substrate 101 is opaque, there may be no need for the optional border layer 184. A transmitting transducer 180*a* that generates surface acoustic waves is situated on one side of the substrate 101 and a corresponding receiving transducer 180*b* that receives the respective generated surface acoustic waves is situated on the opposite side. The transmitting transducer 180*a* generates surface acoustic wave pulses that propagate through the substrate 101 across the peripheral region 115 surface along which a first reflective grating or array 190*a* is disposed. The first reflective array 190*a* is adapted to reflect portions of a surface acoustic wave perpendicularly across the back surface 105 along plural parallel paths to a second reflective array 190*b* disposed on the opposite peripheral region 115 surface (as described below in more detail). The second reflective array 190*b* is adapted to reflect the surface acoustic wave along the peripheral region 115 surface to the receiving transducer 180*b* where the wave is received for processing. Another set of transmitting and receiving transducers 180*a*, 180*b*, and first and second reflective arrays 190*a*, 190*b*, are arranged in the same fashion on the other two opposing sides of the substrate 101. In this way, propagating surface acoustic waves are respectively generated and received in each of the two planar coordinate axes (X and Y) of the front surface 103 of the substrate 101. The transducers 180*a*, 180*b* are operably coupled to a controller or control system (not shown), which may be part of a system processor in some embodiments, that is also operably coupled to the display. The controller or control system drives the operation of the transducers 180*a*, 180*b* and measures the signals from such transducers to determine the touch coordinates, which are then provided to an operating system and software applications to provide the required user interface with the display.

FIG. 3 also illustrates the operation of the touch sensor 100 and, more particularly, the wave paths indicated by solid line arrows and dotted line arrows. In operation, the transmitting transducer 180*a* generates surface acoustic waves that propagate along the top surface of the peripheral region 115 of the back surface 105 on which the first reflective array 190*a* is situated. This is shown as the solid line arrow from the transmitting transducer 180*a* indicating the wave propagation path. The elements of the first reflective array 190*a* each transmit part of the surface acoustic wave to an adjacent element of the array 190*a*. The elements of the first reflective array 190*a* each couple or reflect part of the surface acoustic waves to travel from the first reflective array 190*a* toward the recess 117 and the opposing second reflective array 190*b* on the back surface 105. This is shown as the solid line wavy arrows from the reflective arrays 190*a* indicating the wave propagation path.

As the surface acoustic waves travel across the surface of the recess 117 (shown by the solid line wavy arrow), the thickness (or thinness) of the substrate 101 in the recess 117 permits the surface acoustic waves to "travel" to the front surface 103 via the energy transfer caused by the action of the Lamb wave modes $S_0$ and $A_0$ (shown by the dotted line arrow). The thickness of the substrate 101 in the region of the front surface 103 following the recess 117 then maintains the wave propagation path P on the front surface 103 (shown by the solid line wavy arrow). As seen by the next dotted line arrow and the next solid line wave arrow, the thickness of the substrate 101 in the region of the front surface 103 coinciding with the recess 117 permits the surface acoustic waves to "travel" to the back surface 105 via the energy transfer caused by the action of the Lamb wave modes $S_0$ and $A_0$. The surface acoustic waves are maintained on the back surface 105 in the peripheral region 115 long enough to travel to the second reflective array 190b (shown by the solid line wavy arrows). The elements of the second reflective array 190b each transmit the received surface acoustic waves to an adjacent element of the array 190b so that the waves continue traveling along the second reflective array 190b to the receiving transducer 180b (shown by the solid line arrow). Another set of transmitting and receiving transducers 180a, 180b, and first and second reflective arrays 190a, 190b, on the other two opposing sides of the substrate 101 operate in the same fashion.

The touch of the front surface 103 by an object 128, such as finger or stylus, absorbs a portion of the energy of the surface acoustic waves propagating across the front surface 103 and causes an attenuation of the waves passing through the point of touch. The resulting attenuation is detected by the receiving transducers 180b as a perturbation in the acoustic signal. The control system processes and analyzes the electrical signals transduced by the receiving transducers 180b, including those related to waveform perturbations, to detect the touch coordinates and position information. Further, the control system maps the touch coordinates and position information to the appropriate control actions of the user interface shown in the display that is generally placed behind the back surface 105. The acoustic touch sensor 100 thus provides an XY coordinate input device system.

Each embodiment described above utilizes a typical substrate 51, 101 for an acoustic touch sensor that has a depth or thickness adapted to generally propagate surface acoustic waves, except for a hollowed surface region 67, 117 that has a depth or thickness that permits the transfer of propagating surface acoustic waves from a top surface to a bottom surface. As an alternative, either substrate 51, 101 may be configured entirely with a depth or thickness that permits the transfer of propagating surface acoustic waves from a top surface to a bottom surface (and vice versa). In addition, certain surface regions (e.g., back surface 55, 105 regions) may have an optical bonding material applied thereto that acts to dampen surface acoustic waves traveling across the regions with the applied material sufficiently to maintain the propagation of surface acoustic waves on these regions. The bonding material thus provides a similar benefit of suppressing oscillations as additional thickness for the substrate. Such inversely-configured or alternatively-constructed acoustic touch sensors would operate in the same fashion as the previously-described embodiments 50, 100. At the same time, the substrates 51, 101 may be constructed as "thin substrates" that may be beneficial in certain applications for the acoustic touch sensors 50, 100.

Figure 4A:
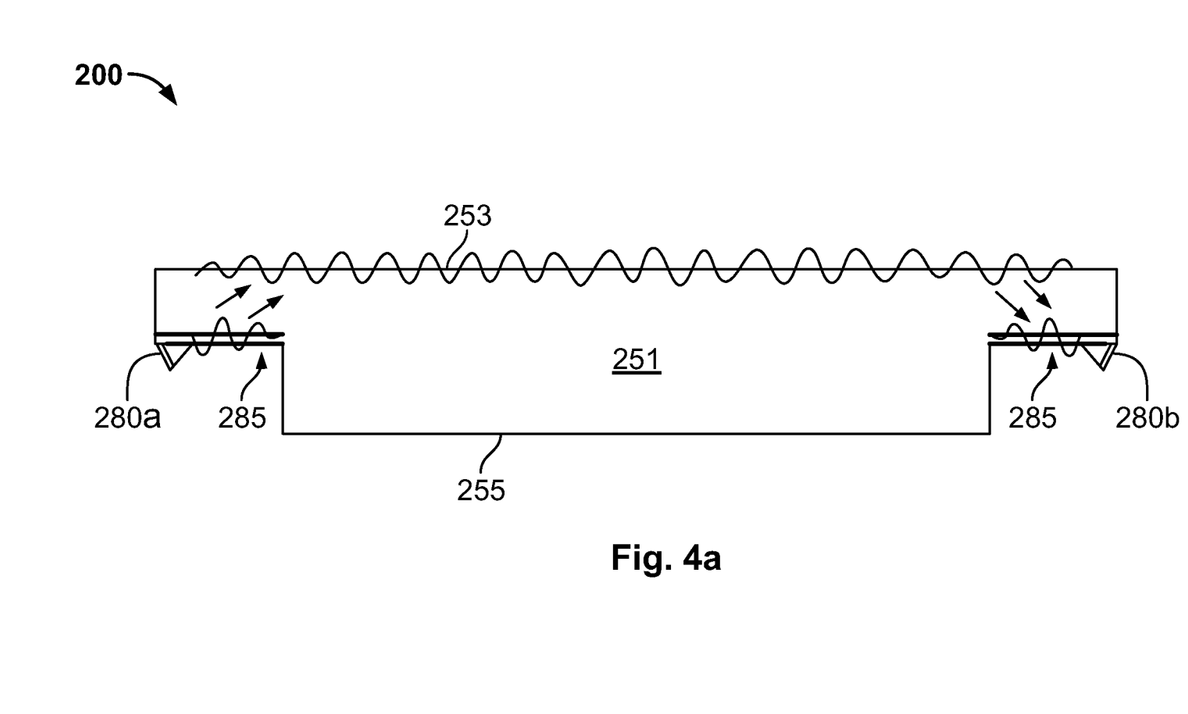
FIG. 4a is simplified cross-sectional view of the sensor of FIG. 2a with a coating material.
Figure 4B:
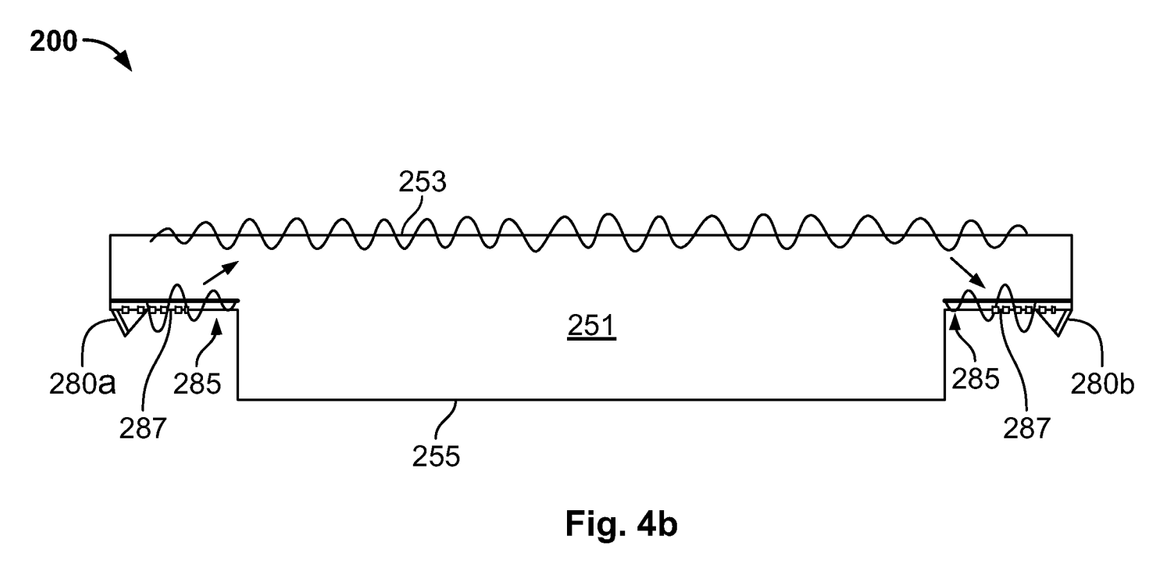
Figure 4C:
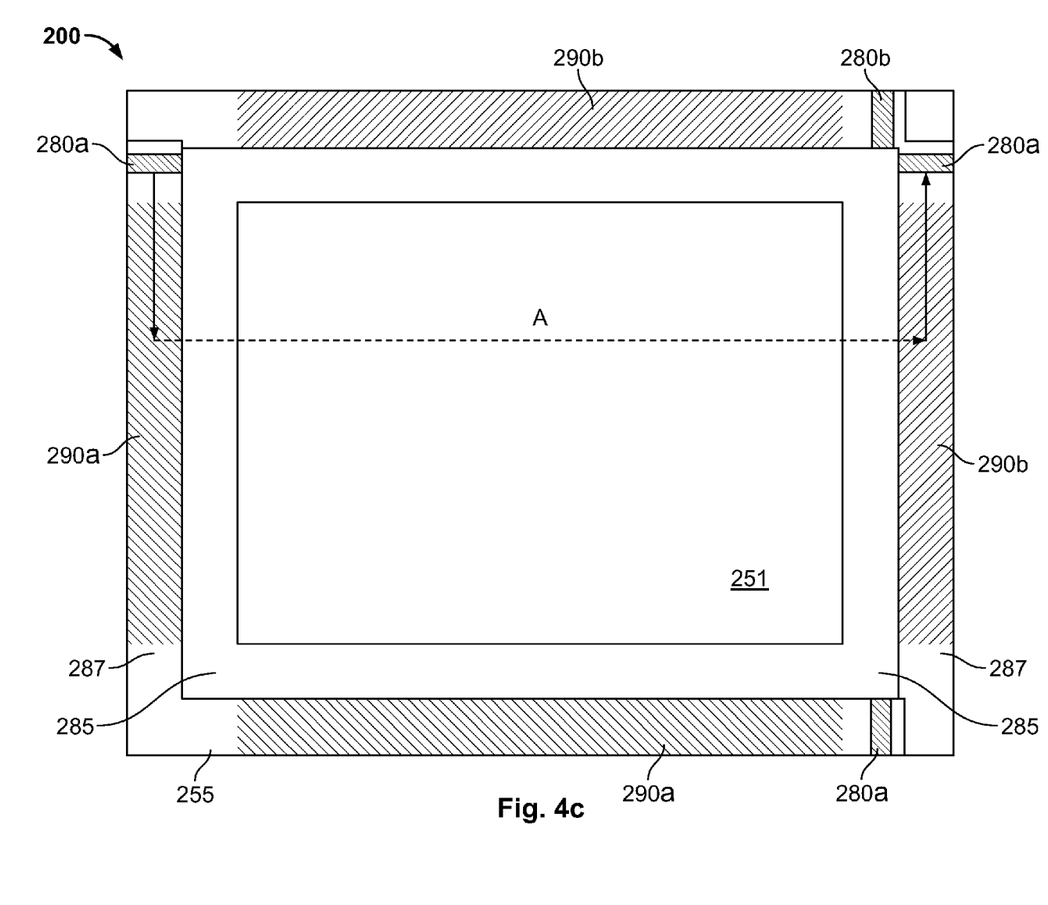
FIG. 4c is a simplified plan view of the variation of the sensor of FIG. 4b.

FIGS. 4a-4c illustrate the use of decorative opaque coatings to hide transducers and arrays and these alternative embodiments of the present invention in more detail. FIG. 4a shows an acoustic touch sensor 200 configured (and operable) in a similar fashion as the acoustic touch sensor 50 of FIG. 2a. The figure shows a substrate 251, a front surface 253, a back surface 255, and transducers 280a, 280b mounted in the thinned perimeter regions of the substrate 251. The sensor 200 has the additional element of an opaque coating 285 (shown in double solid line), which may be colored black or any other color for a desired product appearance, provided on the back surface 255 of the thinned perimeter regions before transducer bonding. As noted above, the coating 285 may be used for the purpose of concealing the transducers 280a, 280b if the substrate 251 is transparent. The choice of coating material and coating thickness needs to be properly selected in order to avoid disrupting efficient transfer of Rayleigh waves between the surfaces 253, 255 (shown by the slanted solid arrows in the thinned perimeter regions). In particular, it is desirable that the change of Rayleigh wave velocity on the bottom surface $\Delta V_R$, is preferably sufficiently small to satisfy the condition $\Delta V_R/V_R \ll \lambda_R/\Lambda$. That is, the fractional change in Rayleigh wave velocity is small compared to the ratio of the Rayleigh wavelength to the desired beat wavelength. As noted previously, similar opaque coatings for similar purposes may also be added to the sensor 100 shown in FIG. 3. However, in some cases, the ability of a coating 285 to disrupt transfer of Rayleigh waves between surfaces may be used advantageously.

For example, FIGS. 4b and 4c show a simplified cross-sectional view and a plan view from the back surface 255, respectively, of a variation of the touch sensor 200. Specifically, the figures show a sensor 200 in which the substrate 251 is transparent, an opaque coating 285 on the back surface of the thinned perimeter regions is used (as in FIG. 4a), a transfer disrupting coating layer 287 is provided on top of the opaque coating 285 (shown in dotted line in FIG. 4b), and Adler-type reflective arrays 290a, 290b (seen in FIG. 4c) are applied on top of the transfer disrupting layer 287 (or may be formed as cut-outs in the layer). The material and thickness of the transfer disrupting layer 287 is preferably chosen so that $\Delta V_R/V_R \gg \lambda_R/\Lambda$, where $\Delta V_R$ is the difference in Rayleigh wave velocity between an uncoated substrate 251 and substrate 251 coated with the transfer disrupting layer 287 (and the opaque layer 285). The reflector arrays 290 themselves may perturb the Rayleigh wave velocity and hence provide or contribute partially to a desired value of $\Delta V_R$. If the transfer disrupting layer 287 reduces the Rayleigh wave velocity (rather than increases it), a further transfer disrupting benefit is provided by an increase in the beat wavelength $\Lambda$ through its strong dependence on the Rayleigh wave velocity $V_R$.

Briefly, in operation, a transmitting transducer 280a generates surface acoustic waves that travel in the thinned perimeter region along the back surface 255 on which a transmitting reflective array 290a is situated. The transfer disrupting layer 287 maintains the propagation of the surface acoustic waves along the array 290a and as they start to be reflected across the back surface 255. This is shown as the solid line arrow portion of the wave propagation path A. The thickness (or thinness) and the length of the thinned perimeter region beyond the transfer disrupting layer 287 permits the surface acoustic waves to "travel" to the front surface 253 via the energy transfer of the Rayleigh waves between surfaces. This is shown by the dotted line portion of the wave propagation path A and the one upward slanted solid line arrow in FIG. 4b. The thickness and length of the thicker central region maintains the wave propagation path A on the front surface 53. The thickness (or thinness) and the length of the thinned perimeter region before the transfer disrupting layer 287 on the opposing side of the substrate 251 then permits the surface acoustic waves to "travel" to the back surface 255 via the energy transfer of the Rayleigh waves between surfaces. This is shown by the one downward slanted solid line arrow in FIG. 4b. The transfer disrupting layer 287 maintains the propagation of the surface acoustic waves as they are received by a receiving reflective array 290b and as they are reflected to a receiving transducer 280b. This is shown as the solid line arrow portion of the wave propagation path A.

Figure 5:
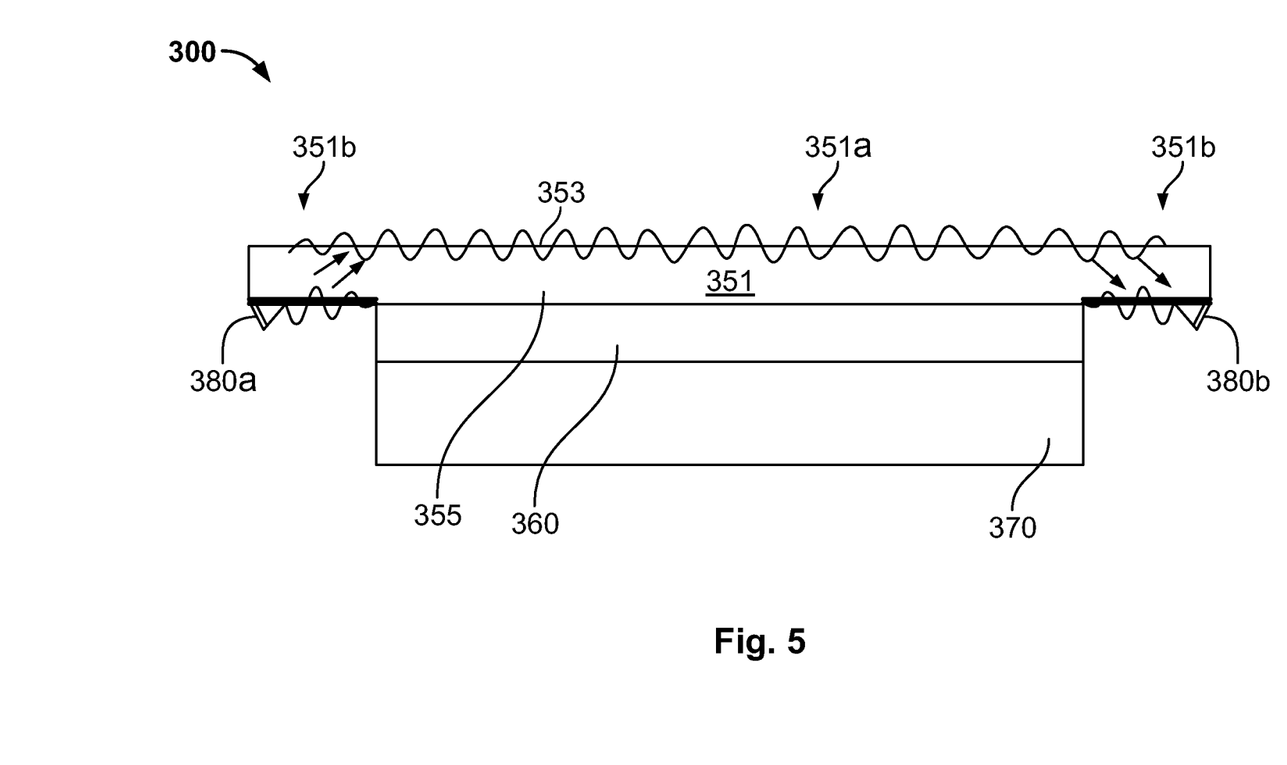

In some applications it may be desirable, for reasons of cost and manufacturability, to use a substrate of uniform thickness, particularly, "thin substrates". This requires the use of means other than substrate thickness variation, like the use of substrate coatings as noted above, to either disrupt or enhance Rayleigh wave transfer between surfaces as needed. FIG. 5 is a simplified cross-sectional view of another variation of the touch sensor 200 in which the central region 351a of the substrate 351 has the same thickness as the perimeter region 351b. This substrate thickness is designed to support Rayleigh wave transfer in the perimeter region 351b (shown by the solid line arrows). Acoustic transducers 380a, 380b are located on the far edge of the perimeter region 351b. In the central region 351b, the back surface 355 is covered with a strong acoustic absorber 360. In the case (as shown) of a transparent substrate 351, the acoustic absorber 360 may be an optical bonding adhesive that also serves to improve the quality of the display 370 image seen through the substrate 351. In any case, any Rayleigh wave motion on the central region 351a of the back surface 355 has a very small amplitude due to rapid attenuation. Referring to FIG. 1c, this corresponds to a condition in which Rayleigh power transfer between the surfaces is small. A better intuitive understanding of this may be provided by considering the basic physics formula P=F·v or power equals force times velocity where the force F exciting the Rayleigh wave on the back surface 355 is proportional to the Rayleigh wave amplitude on the front surface 353, the velocity v of particle motion of the Rayleigh wave on the back surface 355 is very small because it is highly damped, and hence the power P or rate of energy transfer between the surfaces 353, 355 is very small because v is very small. The acoustic touch sensor 300 is otherwise configured (and operable) in a similar fashion as the acoustic touch sensor 50 of FIG. 2a.

Coatings may also be used to enhance transfer of Rayleigh waves between substrate surfaces. If the materials of a coating are selected so as to accelerate the Rayleigh wave velocity, a coating applied symmetrically to both substrate opposing surfaces will shorten the beat wavelength A. By this method, for example, a substrate of uniform thickness may have a thickness T selected to suppress SAW energy transfer between the surfaces in uncoated regions, and yet provide for energy transfer between surfaces in desired regions where symmetric Rayleigh-wave accelerating coatings are applied. So, for example, referring to the sensor 100 of FIG. 3, the substrate 101 may have a selected uniform thickness and the surface recess 117 may be replaced with symmetric accelerating coatings on both surfaces 103, 105 in the same areas in the plan view as the surface recess 117.

The present invention provides the further benefit of facilitating the tiling of touch sensors that may provide an uninterrupted touch sensitive surface of indefinite length. So, again referring to the sensor FIG. 3 as an example, an additional receiving transducer and receiving array identical to the shown receiving transducer 180b and receiving array 190b may be placed immediately to the right or inside of the surface recess 117 next to the transmitting transducer 180a and the transmitting array 190a, and yet not interfere with the signals obtained from the transducers 180a, 180b and arrays 190a, 190b. Likewise an additional transmitting transducer and transmitting array identical to the transmitting transducer 180a and transmitting array 190a may be placed immediately to the left or inside of the surface recess 117 next to the receiving transducer 180b and receiving array 190b. Further, for this configuration, the substrate 101 may be extended indefinitely in the left and right directions, the surface recesses 117 may be repeated with uniform spacing, and each surface recess 117 may have an associated neighboring transmitting transducer—array combination and receiving transducer—array combination as described. This configuration produces an interlocking tiling of touch sensors that provide an uninterrupted touch sensitive surface 103 of indefinite length. This tiling application can be generalized to include orthogonal surface recesses and arrays to provide a two-dimensional tiling of touch sensors. Furthermore, the substrate 101 and the front (exterior) surface 103 need not be planar, but also could be curved and provided with a tiling of touch sensors of a variety of geometries including geometries analogous to the tiling of NASA space shuttle tiles. One application of such a touch sensor tiling may be to form touch sensitive robot shells of non-planar geometry. Tiling of surface acoustic wave touch sensors is described in commonly-owned U.S. Pat. No. 6,091,406 entitled "Grating Transducer for Acoustic Touchscreens", incorporated by reference. More particularly, an improved tiling of SAW touch sensors is described in that the exterior touch surface is completely free of any arrays, gratings or other structures needed for touch sensing operation.

Advantageously, as described with all of the described embodiments, the present invention provides acoustic touch sensors that may be configured with an opaque border layer ink or paint that can be applied to overlie the peripheral operative elements (e.g., the transducers and the reflective arrays) and, further, to extend to the edge of the substrate 51, 101. This allows for easier and more effective mounting of the substrate into a small-sized integrated SAW devices (i.e., mobile or handheld SAW products) compared to an acoustic touch sensor with curved substrate edges. This also meets some of the more demanding aesthetic considerations for certain bezel-less acoustic touch sensors.

Other modifications are possible within the scope of the invention. For example, in each embodiment described, the hollowed surface region 67, 117 may take on various sizes and shapes depending upon engineering or application considerations, such as having graded dimensions, or rounded or smoothed transitions from thin and thick substrate portions for improved manufacturability and to avoid stress concentrating corners. Further, the placement and form of the hollowed surface region 67, 117 may be adapted to optimize either the energy transfer, the maintenance of propagation on a respective surface, or both. Also, the acoustic touch sensors 50, 100 may have "thinned" substrate regions using other means other than hollowed surface regions. Also, as noted above, depending upon various factors, the substrate 15, 101 may utilize different thicknesses to maintain surface acoustic waves propagating on a respective surface and as well as utilize different thicknesses to convert a top surface acoustic wave into a bottom surface acoustic wave (and vice versa).

What is claimed:

1. An acoustic touch apparatus, comprising a substrate, having top and bottom surfaces, that is adapted in a first region to propagating surface acoustic waves along substrate surfaces and in a second region to transferring propagating surface acoustic waves from the one of the surfaces to the other surface through the substrate via top-bottom oscillation; at least one acoustic wave transducer on the bottom surface that is adapted to transmit surface acoustic waves; and at least one acoustic wave transducer on the bottom surface that is adapted to receive surface acoustic waves from the transmitting transducer, said substrate having, between the transmitting transducer and the receiving transducer, at least one first region disposed between two second regions.

2. The apparatus of claim 1, wherein the first region has a thickness that is at least 3.5 Rayleigh wavelengths.

3. The apparatus of claim 1, wherein the first region has a thickness that is at least 5.5 Rayleigh wavelengths.

4. The apparatus of claim 1, wherein the second region has a thickness sufficiently thin to convert a surface acoustic wave on a first surface to a surface acoustic wave on a second surface.

5. The apparatus of claim 4, wherein the second region is dimensioned to inhibit the surface acoustic wave on the second surface from converting back to a surface acoustic wave on the first surface.

6. The apparatus of claim 1, wherein the second region has a thickness sufficiently thin to transfer acoustic surface wave energy between the top and bottom surfaces of the substrate.

7. The apparatus of claim 1, wherein the first region and the second regions are dimensioned so that the surface acoustic waves transmitted by the transmitting transducer travel from the bottom surface to the top surface through the substrate; along the top surface; and from the top surface to the bottom surface through the substrate to be received by the receiving transducer, said top surface forming a touch sensing region for the apparatus.

8. The apparatus of claim 7, wherein the length of the second region is approximately one-half of the beat wavelength of the surface acoustic waves.

9. The apparatus of claim 8, wherein thickness of the second region is adjustable to tune the beat wavelength and the length of the second region to selected respective measurements.

10. The apparatus of claim 7, wherein the length of the first region is shorter than the beat wavelength of the surface acoustic waves.

11. The apparatus of claim 1, wherein a portion of the bottom surface in the second region has a coating material applied thereon sufficient to suppress the transfer of acoustic surface wave energy between the top and bottom surfaces of the substrate within that portion.

12. An acoustic touch apparatus, comprising:
 a. a substrate that has top and bottom surfaces and that is adapted in a first region to propagating surface acoustic waves along substrate surfaces and in a second region to transferring propagating surface acoustic waves from the one of the surfaces to the other surface through the substrate via top-bottom oscillation;
 b. at least one acoustic wave transducer on the bottom surface that is adapted to transmit surface acoustic waves;
 c. at least one acoustic wave transducer on the bottom surface that is adapted to receive surface acoustic waves;
 d. at least one reflective array on the bottom surface that is adapted to reflect the surface acoustic waves from the transmitting transducer towards the receiving transducer; and
 e. at least one reflective array on the bottom surface that is adapted to receive and reflect the reflected transmitted surface acoustic waves to the receiving transducer, said substrate having, between the transmitting transducer and the receiving transducer, at least one first region disposed between two second regions.

13. The apparatus of claim 12, wherein the first region has a thickness that is at least 3.5 Rayleigh wavelengths.

14. The apparatus of claim 12, wherein the first region has a thickness that is at least 5.5 Rayleigh wavelengths.

15. The apparatus of claim 12, wherein the second region has a thickness sufficiently thin to convert a surface acoustic wave on a first surface to a surface acoustic wave on a second surface.

16. The apparatus of claim 15, wherein the second region is dimensioned to inhibit the surface acoustic wave on the second surface from converting back to a surface acoustic wave on the first surface.

17. The apparatus of claim 12, wherein the second region has a thickness sufficiently thin to transfer acoustic surface wave energy between the top and bottom surfaces of the substrate.

18. The apparatus of claim 12, wherein the first region and the second regions are dimensioned so that the surface acoustic waves transmitted by the transmitting transducer and reflected by the first reflective array travel from the bottom surface to the top surface through the substrate; along the top surface; and from the top surface to the bottom surface through the substrate to be reflected by the second reflective array to the receiving transducer, said top surface forming a touch sensing region for the apparatus.

19. The apparatus of claim 18, wherein the length of the second region is approximately one-half of the beat wavelength of the surface acoustic waves.

20. The apparatus of claim 19, wherein thickness of the second region is adjustable to tune the beat wavelength and the length of the second region to selected respective measurements.

21. The apparatus of claim 18, wherein the length of the first region is shorter than the beat wavelength of the surface acoustic waves.

22. The apparatus of claim 12, wherein a portion of the bottom surface in the second region has a coating material applied thereon sufficient to suppress the transfer of acoustic surface wave energy between the top and bottom surfaces of the substrate within that portion.

* * * * *